United States Patent Office 3,156,245
Patented Nov. 10, 1964

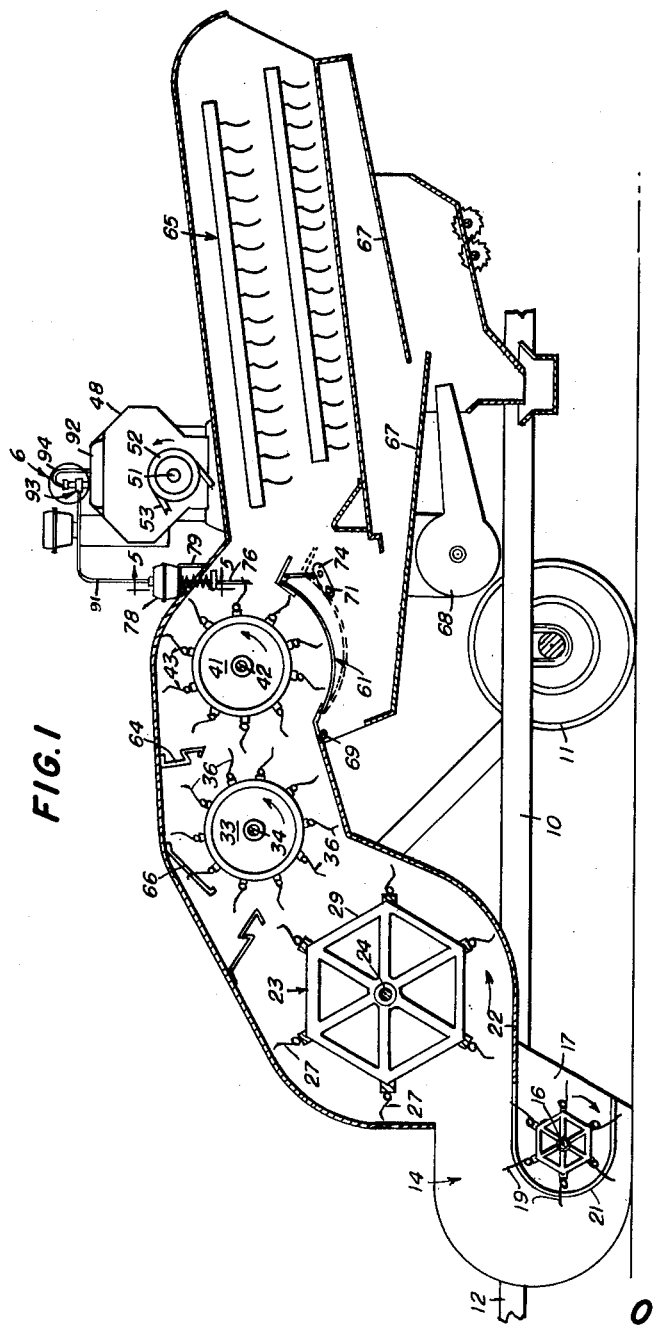

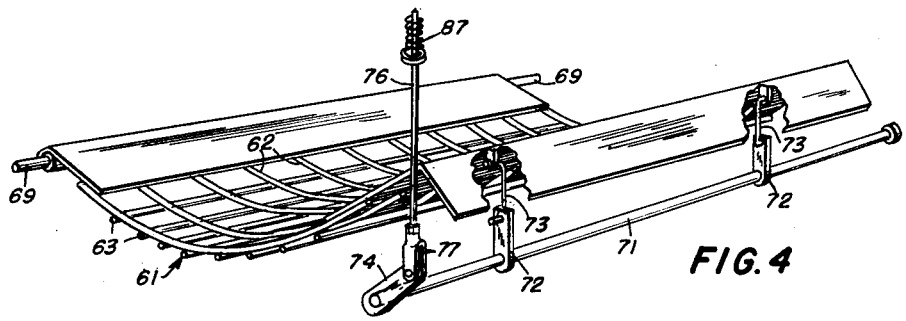
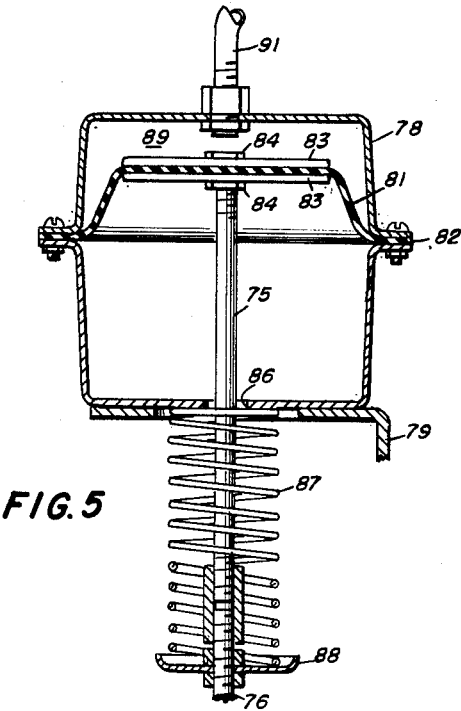
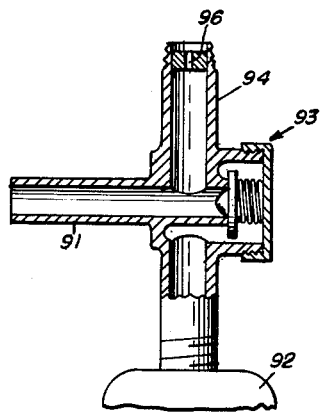
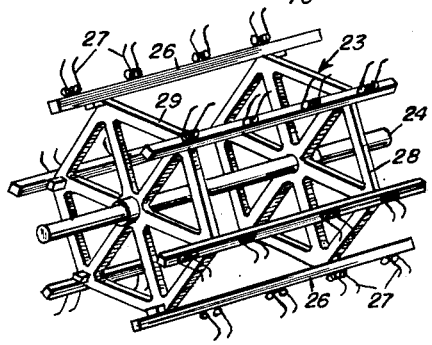

3,156,245
PEANUT PICKING MACHINE
Oliver K. Hobbs, Suffolk, Va., assignor to Benthall Machine Company, Inc., Suffolk, Va., a corporation of Virginia
Filed Sept. 25, 1961, Ser. No. 140,402
3 Claims. (Cl. 130—27)

The present invention relates to apparatus for threshing agricultural produce such as the detachment and separation of the nuts from peanut vines and the invention more specifically pertains to improvements in a peanut picking machine adapting such apparatus for efficient operation throughout a wide range in the volume at which the vines with the peanuts thereon are supplied into the machine and throughout a wide range in the moisture content of the vines.

The character of peanut vines varies pronouncedly with the moisture content therein. When the vines are dry they may be readily broken with a force of several ounces. When the vines are damp or when moisture is present several pounds are required to break the vines. In threshing peanuts the moisture content of the vines being supplied to the machine for separation of the peanuts varies over a wide range. In one area of a field where the soil is light and the vines small rapid curing occurs so that the vines have a low moisture content. In other areas of the same field where the soil is heavier or in shaded areas or when the humidity is high the curing takes place at a much slower rate so that the vines have a relatively high moisture content. Accordingly in any windrow or during manual feeding of the machine a wide variation of moisture conditions may be encountered. The volume of the vines in any given windrow varies and when the vines are manually fed into a peanut picking machine the volume varies along with the moisture content of the vines.

It is accordingly an object of the present invention to provide means within a peanut picking machine for adapting the threshing characteristics of the apparatus to changes in the volume of vines supplied into the machine and to maintain the vines within the shredding zone when there is momentary overloading or when the moisture is sufficiently high so as to more effectively remove peanuts from the vines.

A more specific object of the invention is to provide one of the threshing cylinders or shredding reels with an open internal structure which serves as a reservoir to receive and temporarily store a portion of an excess load which may result from changes in volume of the windrow or during slugging in manual feeding so that the excess stored in the reservoir will be fed back into the presence of the threshing cylinders or reels when there is a decrease in the volume of the vines being delivered into the machine.

Another object of the invention is to provide an adjustable concave for one of the threshing cylinders of a peanut picking machine including means for altering the position of the concave with respect to the associated cylinder in response to changes in the moisture content of the vines and in response to changes in the volume of the vines undergoing threshing.

A more specific object of the invention is to provide an adjustable concave for a peanut picking machine wherein the threshing elements are driven by power supplied by an internal combustion engine so that the load on the engine increases in response to an increase in the moisture content of the vines or an increase in the volume of vines including means actuated by changes in the load on the engine providing for changes in the position of the concave.

Other objects and features of the invention will be appreciated and become apparent particularly to those skilled in the art to which the invention pertains as the present disclosure proceeds and upon consideration of the following detailed description taken in conjunction with the accompanying drawings wherein an embodiment of the invention is disclosed.

In the drawings:

FIG. 1 is a longitudinal sectional view substantially on the center line of a peanut picking machine exhibiting the invention.

FIG. 2 is a diagrammatic side elevational view on a smaller scale showing the manner in which power is transmitted from the engine to the threshing cylinders.

FIG. 3 is a fragmentary plan view of a portion of the concave.

FIG. 4 is a perspective view of the adjustable concave illustrating some of the elements which provide for the adjustment of the position of the concave.

FIG. 5 is an enlarged sectional view of a housing in which pressure changes are developed by the load on the engine to control the position of the concave and taken on the line 5—5 of FIG. 1.

FIG. 6 is an enlarged sectional view of a valve encircled at 6 in FIG. 1 and associated with the conduit line leading to the manifold of the engine.

FIG. 7 is a perspective view of one of the reels showing the open interior which serves as a reservoir for some of the vines.

The invention is directed to improvements in a peanut threshing machine which may be of the type for gathering the vines from the ground and such apparatus includes a frame 10 of any desired character and wheels 11 for supporting the machine for rolling movement over a field. The apparatus is adapted to be towed by a tractor or the like connected to tongue means 12 which projects forwardly from the machine and may be connected to a draw bar of a tractor. The hitch serves to maintain the machine in generally horizontal position with a pick-up mechanism 14 in the desired relationship close to the surface of the ground as the machine is moved over a field.

The apparatus is provided with a series of cylinders or reels for advancing the vines through the threshing zone where the nuts are detached from the vines. The apparatus includes means for receiving the peanuts and means for cleaning and separating the vines and trash from the peanuts. A pick-up reel has spring fingers which elevate the vine with the nuts thereon and delivers them into the path of movement of a spring finger of a first reel or cylinder which also moves the vines into the presence of the spring fingers of a second and smaller cylinder. Some peanuts are dislodged from the vines during the action of the two cylinders with the second cylinder delivering the vines into the presence of a third cylinder. Peanuts are stripped from the vines by action of the third cylinder and fall through openings in a concave associated with the third cylinder. The peanuts pass through a concave and are subjected to cleaning action while moving to means for collecting the nuts. The shredded vines and the chaff are moved rearwardly and out of the machine.

The active elements of the pick-up mechanism 14 includes a shaft 16 which is journalled for rotation and supported by spaced sides plates 17 and 18 at the forward end of the machine. The shaft 16 carries a reel structure with spring fingers 19 thereon which engage the peanut vines. The spring fingers 19 extend through slots formed in an arcuate plate 21. The pick-up mechanism is of conventional construction and operates in the usual manner to elevate the vines with the nuts thereon and deliver them onto the horizontal portion 22 of a bottom plate.

The shaft 16 carries a pulley 23 on the outer end thereof as shown in FIG. 2.

The vines with the peanuts thereon delivered onto the bottom plate are moved rearwardly in the machine by means of a first cylinder or reel structure indicated at 23. A shaft 24 supports the reel 23 for rotation on bearings (not shown) mounted at the side walls of the machine. The reel or cylinder 23 is formed as a skeleton structure having an open interior as best shown in FIG. 7 and which serves as a reservoir for some of the vines and the function thereof will be made more apparent as the disclosure proceeds. In order to provide the desired open interior for the reel 23 two generally wheel shaped members 28 and 29 are secured to the shaft 24. A plurality of longitudinally extending circumferentially spaced bars 26 are carried by the wheel shaped members 28 and 29. Each bar 26 supports a series of spring fingers 27. Two pulleys 31 and 32 (FIG. 2) are secured to the shaft 24 at the exterior of one of the side walls. The shaft 24 is driven by the internal combustion engine through a belt or chain transmission assembly as hereinafter described to rotate in a counter-clockwise direction as indicated by the arrow in FIG. 1.

As the reel 23 is rotated the spring fingers 27 engage the vines with the nuts thereon and sweep them rearwardly and elevate them into the presence of a second cylinder 33. This cylinder is mounted on a shaft 34 and which is supported for rotation by means of bearings (not shown) supported outside the side walls of the machine. The cylinder 33 may be of any desired structure and carries a plurality of spring fingers 36. The cylinder 33 is driven by the engine at a speed which is approximately five times that of the reel or cylinder 23. The spring fingers 36 engage the vines and snatches them from the nuts and the vines are shredded to some extent by the action of the cylinder 33. A pulley 37 and a sprocket wheel 38 are secured to the shaft 24 outboard of the side wall of the machine.

The vines are moved rearwardly in the machine by the cylinder 33 into the presence of a third cylinder 41 which may be of conventional construction. The cylinder 41 is supported for rotation by a shaft 42 which may be journalled in bearings supported at the sides of the apparatus. The cylinder 41 carries a plurality of circumferentially spaced spring fingers 43. The partially shredded vines which pass over the cylinder 33 are engaged by both the fingers 36 and the fingers 43 which provides further shredding action. A small sprocket wheel 44 and a pulley 46 are secured to the shaft 42 outside the side wall of the machine.

The reel or cylinder 23 and the cylinder 33 and the cylinder 41 along with the pick-up reel are driven by means of an internal combustion engine 48. The drive shaft 51 of the engine is provided with a pulley 52. Belt means 53 trained about the pulley 52 and the pulley 46 drive the shaft 42 and the cylinder 41. A chain 54 trained about the sprocket 44 and the sprocket wheel 38 drive the cylinder 33. A belt 56 trained about the pulley 37 and the pulley 32 provides for transmitting power to the reel or cylinder 23. The speed of rotation of the cylinders and the reel increases in proceeding rearwardly of the machine.

A concave 61 is mounted under the threshing cylinder 41. The concave 61 is of arcuate shape in side elevation and has a radius similar to the path of movement of the free ends of the spring fingers 43. The concave 61 is formed of a series of transversely extending rods 63 which extend substantially at right angles to the rods 62 to form a grid structure with open areas between the rods.

In operation the pick-up mechanism delivers the vines with the nuts thereon onto the portion 22 of the bottom plate. The reel or cylinder 23 by action of the spring fingers 27 move the vines with the nuts thereon rearwardly within the machine into the presence of the action of the spring fingers 36 carried by the threshing cylinder 33.

The spring fingers 36 on the cylinder 33 engage the vines and there is some shredding by the action of the spring fingers 36 and some of the nuts are removed as the vines are snatched away from the peanuts by movement of the spring fingers 36.

The vines pass under the cylinder 33 to a position to be engaged by the picking cylinder 41. Some of the vines move around the circumference of cylinder 41 and a major picking operation of the nuts takes place in the area between the cylinders 33 and 41. After the vines have been subjected to the shredding action of the spring fingers carried by the cylinders 33 and 41 the lowermost of the vines pass over the concave 61. Centrifugal action causes the peanuts still attached to the vines to bump the transverse rods 63 so that these nuts are detached from the vines and fall through the openings between the rods 62 and 63. When the downstream end or rear end portion of the concave 61 is in a position close to the path of movement of the spring fingers 43 there is a tendency for the longer vines to move around the cylinder 41 and over the top where these vines are subjected to shredding action between the spring fingers 36 and 43. Some of these shredded vines then pass under the cylinder 41 while other portions of the vines pass over the top of the cylinder 33. Deflector boards 64 and 66 located between the cylinders prevent these vines from being thrown to the front of the machine and direct the vines to positions for action of the spring fingers between the cylinders.

The vines or shreads thereof from which the nuts have been detached pass over the concave 61 into the vine rack section 65 where they are subjected to overhead walker fingers to remove any loose nuts mixed with the vines. The peanuts after passing through the concave 61 and those that are separated from the trash are delivered onto inclined plates 67 and the nuts are guided past an air stream furnished by the blower 68. The nuts after cleaning are collected for movement into a bin or to a bag filling station.

It will be observed from a consideration of FIGS. 1 and 7 that the bars 26 of the cylinder 23 are maintained in circumferentially spaced relationship. The rate of rotation of the reel or cylinder 23 is low with respect to the threshing cylinders. When there is an excess of vines within the threshing zone some of these vines move into the interior of the reel 23 between the bars 26. The reel 23 thus serves as a reservoir to accommodate an excess of the volume of the vines in the threshing or shredding zone and such entry of the vines may occur when they are moist or when there is a large volume in a particular portion of a windrow or when there is slugging during manual feeding of the machine. The vines accommodated within the reel 23 escape through that portion of the reel when it arrives in the lowest part of its path of movement and when the volume of vines entering the machine drops sufficiently to permit such action. Thus the reel 23 serves as a reservoir for portions of vines and until the overload condition no longer exists at which time the excess vines are delivered from the reel 23 for further stripping and shredding.

The concave 61 is mounted for adjustment of the position thereof relative to the picking cylinder 41. The forward end of the concave is supported for pivoting movements by a shaft 69 which is mounted in bushing carried by the forward end of the concave. The ends of the shaft 69 project through openings in the side walls of the machine and are accommodated in suitable supported bearings. The concave 61 is thus capable of pivoting about the axis of the shaft 69. The rear end of the concave is supported for substantially vertical movements. A counter-shaft 71 is journalled for rotation in suitably supported bearings so as to be rotatable. Arms 72 are secured to the shaft 71 and extend therefrom. The free ends of the arms 72 are pivotally connected to the downstream end of the concave 61 by means of links 73. A crank arm 74 is attached to an end of the shaft 71 and a vertically disposed rod 76 is pivotally connected to the free end of the crank arm 74 by any suitable means such as a bifurcated element 77.

A housing 78 (FIGS. 1 and 5) may be supported on the machine in any convenient manner such as by means of a bracket 79 and accommodates the upper end of an extension 75 of the rod 76. A flexible diaphragm 81 extends throughout the cross sectional area of the housing 78 and has its perimeter sealed with respect to the housing as indicated at 82. The upper end of the rod extension 75 is secured to the diaphragm 81 by means of plates 83 and nuts 84. An opening 86 is provided in the housing 78 through which the rod assembly extends and this opening is of larger cross section than the rod structure to admit air under atmospheric pressure into the housing 78 below the diaphragm 81. A helical spring 87 surrounds the rod assembly. One end of the spring 87 is in abutting relationship with the bottom wall of the housing 78 and the other end engages a disc-shaped abutment member 88 carried by the rod assembly.

A closed chamber 89 is provided within the housing 78 above the diaphragm 81. A conduit 91 attached to the housing 78 in communication with the chamber 89 extends into the manifold 92 of the engine 48 through an adjustable bleed valve 93. A conduit fitting 94 on the valve 93 provides means for connecting a tube thereto which leads to atmospheric air through the air cleaner for the engine.

A change in the moisture content of the vines or a change in the volume of the vines undergoing threshing alters the power required to drive the threshing cylinders. An increase in the moisture content or an increase in the volume increases the load on the engine 48. When the vines are well cured or when the volume is light the load on the engine is low. When the load is light the pressure within the manifold 92 of the engine 48 is at a low level. The low pressure within the manifold 92 draws air from the chamber 89 within the housing 78 through the conduit 91 and the valve 93. Air at atmospheric pressure enters the housing 78 through the opening 86 and acts on the under surface of the diaphragm. Such action develops a force sufficient to move the rod 76 upwardly and to compress the spring 87. Upward movement of the rod 76 rotates the counter-shaft 71 in a counter-clockwise direction and the arms 72 assume substantially vertical positions shown in FIG. 4. The downstream end of the concave 61 is then shifted to its highest position as illustrated in FIG. 1.

An increase in the load on the engine 48 as a consequence of an increased volume of vines in the shredding and threshing zone or as a consequence of the vines having a greater moisture content will cause the pressure in the manifold 92 to rise. Air at atmospheric pressure entering the fitting 94 through the orifice 96 moves into the chamber 89 through the conduit 91. A condition then develops where the pressure within the chamber 89 increases to substantially balance the pressure within the housing 78 below the diaphragm 81. The weight of the concave 61 plus the energy stored in the spring 87 are then sufficient for the rod 76 to move downwardly whereby the counter-shaft 71 rotates in a clockwise direction so that the downstream end of the concave moves away from the picking cylinder 41. Lowering of the downstream end of the concave 61 allows vines of long lengths to pass over the concave into the vine rack section 65 because the opening between the cylinder 41 and the concave 61 is larger and centrifugal action causes the longer vines to be at an angle more favorable for discharge from the spring fingers 43. Thus the position of the concave determine the quantity of vines that are delivered to the vine rack section. When the concave shifts away from the cylinder 41 the load on the engine 48 is reduced so that a balance of forces as determined by the vine condition and volume serve to adjust the position of the concave.

While the invention has been described with reference to a peanut picking machine suitable for harvesting the peanuts arranged as a windrow the invention is equally applicable to other types of peanut harvesting machines. Changes may be made in the various elements of the apparatus along with the alterations in the overall assembly. Such modifications and others may be made without departing from the spirit and scope of the invention as set forth in the appended claims.

What I claim and desire to secure by Letters Patent is:

1. In apparatus for detaching peanuts from their vines the combination of, a threshing mechanism including a group of horizontally disposed cylinders arranged in side by side relationship, a housing encasing said cylinders receiving vines with peanuts thereon as the apparatus is moved forwardly, an internal combustion engine supported on said housing, means transmitting power from said engine to said threshing mechanism rotating all of said cylinders to move the vines rearwardly through the threshing mechanism, a concave positioned under the rearwardly located cylinder of said group, pivot means at a forward portion of said concave supporting it for swinging movements whereby portions of the concave rearwardly of said pivot means may be raised and lowered with respect to the path of movement of the periphery of said rearwardly located cylinder, an intake manifold on said engine having a low pressure therein with a rise in said pressure as the load on the engine increases as a consequence of the cylinders engaging said vines, means including a linkage connected to a rear portion of said concave responsive to atmospheric pressure and said low pressure condition within said manifold to move portions of said concave rearwardly of said pivot means upwardly towards the path of movement of the periphery of said cylinder, and means operably responsive to said higher pressure within said manifold shifting portions of the concave rearwardly of said pivot means downwardly and away from the path of movement of the periphery of said cylinder.

2. In apparatus for detaching peanuts from their vines the combination of, a threshing mechanism including a group of horizontally disposed cylinders arranged in side by side relationship, a housing encasing said cylinders receiving vines with peanuts thereon as the apparatus is moved forwardly, an internal combustion engine supported on said housing, means transmitting power from said engine to said threshing mechanism rotating all of said cylinders to move the vines rearwardly of the threshing mechanism, a concave positioned under the rearwardly located cylinder of said group, means at a forward portion of said concave supporting it for pivotal movements whereby portions of the concave rearwardly of its pivotal support may be raised and lowered with respect to the path of movement of the periphery of said rearwardly located cylinder, means including a linkage connected to the rear portion of said concave responsive to an increase in the load on said engine resulting from engagement of said cylinders with the vines lowering the portion of said concave rearwardly of its pivotal support, and means responsive to a decrease in the load on said engine as a consequence of engagement of said cylinders with said vines for shifting said linkage to raise the portion of said concave rearwardly of its pivotal support.

3. In apparatus for separating peanuts from the vines on which they grow the combination of, a housing, a threshing mechanism including a cylinder mounted for rotation within said housing, a concave positioned adjacent the path of movement of the periphery of said cylinder, pivot means supporting a forward portion of said concave for swinging movements so that portions of the concave rearwardly of said pivot means may be moved towards and away from the path of movement of the periphery of said cylinder, an engine mounted on said housing, means transmitting power from said engine to said threshing mechanism rotating said cylinder to move peanut vines rearwardly between the cylinder and said concave, means including a linkage connected to a rear portion of said concave responsive to one load condition on said engine moving all portions of the concave rearwardly of its pivot means towards the path of movement of the periphery of said cylinder, and said last means responsive to an increase in said load condition on said engine rendering said means ineffective whereby all portions of the concave rearwardly of said pivot means move away from the path of movement of the periphery of said cylinder.

References Cited in the file of this patent

UNITED STATES PATENTS

| | | |
|---|---|---|
| 2,791,252 | Church | May 7, 1957 |
| 2,974,467 | Long | Mar. 14, 1961 |

FOREIGN PATENTS

| | | |
|---|---|---|
| 1,112,546 | France | Mar. 15, 1956 |